United States Patent
Günther

[11] Patent Number: 5,316,468
[45] Date of Patent: May 31, 1994

[54] SIDE GATE HOT RUNNER NOZZLE

[75] Inventor: Herbert Günther, Allendorf/Eder, Fed. Rep. of Germany

[73] Assignee: Dipl.-Ing Herbert Gunther Gesellschaft mbH, Perchtoldsorf, Austria

[21] Appl. No.: 930,895

[22] Filed: Aug. 17, 1992

[30] Foreign Application Priority Data

Aug. 16, 1991 [DE] Fed. Rep. of Germany ....... 4127035

[51] Int. Cl.$^5$ ............................................. B29C 45/20
[52] U.S. Cl. ................................ 425/549; 264/328.15; 425/572
[58] Field of Search ............... 425/547, 548, 549, 567, 425/568, 570, 572; 264/328.15

[56] References Cited

U.S. PATENT DOCUMENTS 4,981,431 1/1991 Schmidt ........................... 425/549

FOREIGN PATENT DOCUMENTS 9003574 8/1990 Fed. Rep. of Germany .

Primary Examiner—Tim Heitbrink
Attorney, Agent, or Firm—Fred Philpitt

[57] ABSTRACT

A casing (12) of an injection molding machine including at least one hot runner nozzle (10) retains the same by its shaft (20) which extends into a mold insert (16) and which supports at least one nozzle tip (50, 50') that projects over the shaft up to an article (K) to be molded. The mold insert includes an undercut (70) into which the nozzle tips (50, 50') are inserted by a two-step movement, viz. e.g. in a first direction (S) approximately parallel and then in a transversal direction (Q) relative to the axis (A) of a flow tube (22) that is heatable from its outside. The nozzle tips (50, 50') are fixed to a shaft foot portion (38) so as not to contact the casing (12) or a wall (17) of the mold insert (16). A peripheral step (34) centers the shaft (20) whose high-strength foot portion (38) heat-conductively retains the nozzle tips (50, 50'). A thermally separating sleeve (36) joined to the foot portion (38) is continued towards the casing (12) by a heat-conducting envelope tube (30). An inner heat-conductive bush (40) is thermally insulated from the separating sleeve (36) by air gaps (54, 44) and by a supporting ring (56).

14 Claims, 3 Drawing Sheets

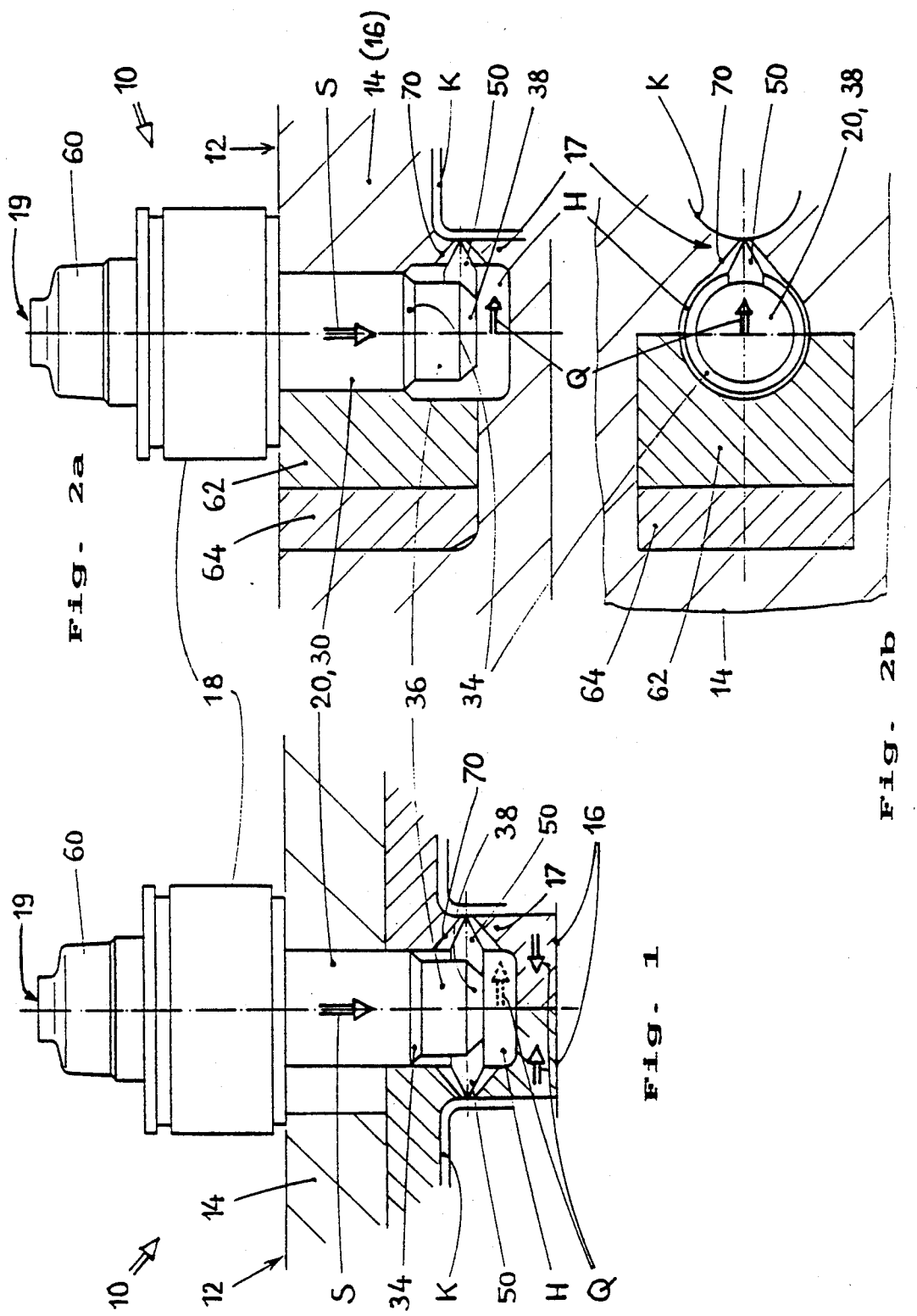

SIDE GATE HOT RUNNER NOZZLE

FIELD OF THE INVENTION

The invention relates to a hot runner nozzle.

Such nozzles are used for passing a flow of plastics material from an injection molding machine to an injection point in the molding tool. For this purpose, the thermo-plastic mass within the flow tube system must be kept fluid until it is made to freeze in the mold. The temperature drop at the transition points require skillful processing in order to minimize power consumption.

PRIOR ART

Hot runner nozzles have been known which have nozzle tips at their lower end portions in order to gate an article from various points or to manufacture several articles at the same time. Conventionally, two to four nozzle tips each are inserted into a hot runner foot portion in a direction either parallel or at an angle of 45° to the axis of a flow tube extending through the hot runner nozzle.

A design disclosed in DE 90 03 574 U1 features an active component, viz. a nozzle body including a flow tube, and a passive retainer having radial tips which serve to laterally hold the unit in a position that safeguards a narrow ring gap around each injection point. Practical experience, however, showed that some melt will always enter between joint faces and will solidify there. The resulting uncontrolled heat insulation impedes the heat transfer from the active nozzle component to the injection points even though the radial tips be heat conductive and, therefore, the quality of the articles produced tends to vary greatly.

OBJECTS OF THE INVENTION

The invention aims at generally improving the prior art hot runner nozzles in respect of their thermodynamic performance in order to overcome the drawbacks mentioned.

It is an object of the present invention to create a hot runner nozzle design of simple and rugged structure permitting optimum heat transfer to the injection points of the articles to be molded.

Another object of the invention consists in providing a hot runner nozzle adapted to be manufactured economically to be mounted rapidly and to mass-produce perfect articles of plastic material in cost-saving operation even with tools into which insertion of conventional nozzles is not easy or not possible at all.

SUMMARY OF THE INVENTION

For use with an injection molding device having a casing, a mold cavity plate and a mold insert having a lateral wall, a hot runner nozzle is provided with a top portion having a flow opening and a broad flanged body, with a slender shaft retained in the casing so as to extend into the mold insert and with at least one nozzle tip outwardly directed at an angle relative to the axis of an externally heatable flow tube that extends through the flanged body and the shaft, the free ends of the nozzle tips reaching free of contact through the mold insert wall up to an article to be molded. In the improvement according to the invention, the mold insert is divided so as to consist of two halves and retain the nozzle tips therebetween, and the insert halves are adapted to be displaced in a direction transverse to the axis and to be wedged in a closed position within the casing. It is thus possible to move the two halves apart prior to assembly, to properly position the nozzle tips and to fix them as the halves are closed. This design is also particularly useful for lateral injection since the recoil forces occurring under the injection pressure will act only upon the very small terminating face of the nozzle tip.

Independent protection is sought in one embodiment, wherein the molded insert comprises at least one undercut for receiving the nozzle tips to be mounted in a two-step movement in directions that are at an angle to each other. In order to get behind the undercut, an at least two-dimensional relative movement must be performed between the nozzle and the mold insert; in practice, this is easily done. An important advantage is that radially projecting nozzle tips, too, can be mounted conveniently and exactly in an opening or bore of the mold insert. Preferably, the movement steps are perpendicular to one another, with the first step being substantially parallel to the flow tube axis and the second step being at an angle thereto, substantially in a transverse direction.

Expediently there is no contact between the casing and the nozzle tips which are form-fitted or welded to the foot portion of the shaft end that is also spaced relative to the casing but retains and centers the nozzle tips especially at an outer step or shoulder that is re-entrant towards the slender shaft.

In a preferred embodiment, the shaft includes a high-strength foot portion which heat-conductively receives the nozzle tips and is joined by a thermally separating body that, in turn, is connected to a high-strength heat-conducting component. Thus, the shaft is thermally graded; the separating body, preferably a sleeve welded between an envelope tube and the foot portion, is effectively insulating the hot elements from the casing. The heat produced is concentrated at the flow tube end by special heating means tightly enclosing the flow tube, e.g. a slotted heating tube or a variable helix heating coil, and the lower end of the heating means is connected to a metal bush form-fitted to both the flow tube end and the shaft foot portion.

A thermally resistive or insulating ring support made of ceramics, titanium, nickel chromium steel or some other heat-transfer impeding material may be arranged between neighboring faces of the metal bush and of the separating sleeve, and conical air gaps are expediently provided in the upper regions of these latter components. Consequently, the hot melt will reliably reach the injection points. In addition, the sturdy design thus provided warrants economical operation even under the actual stresses of elevated temperatures and high pressure ranging from 300 bars to 2 kbars (which roughly equals 2 to 13 ton/in$^2$).

In another embodiment at least one further nozzle tip can be fixed to the shaft foot portion at an angle between 0° and 90° relative to the flow tube axis. This will greatly promote multiple gating, as the nozzle tips can be most accurately positioned for maximum heat transfer to the injection points of the article or several articles to be molded.

Further features, particulars and advantages of the invention will be apparent from the wording of the claims and from the following disclosure of preferred embodiments shown in the

BRIEF DESCRIPTION OF THE DRAWINGS

FIG. 1 shows a partly sectional view of a mounted unit,

FIG. 2a shows a nozzle mounting similar to FIG. 1,

FIG. 2b is a partly sectional bottom view corresponding to the mounting of FIG. 2a, FIG. 3 is a longitudinal section through a hot runner nozzle

Figure 3:
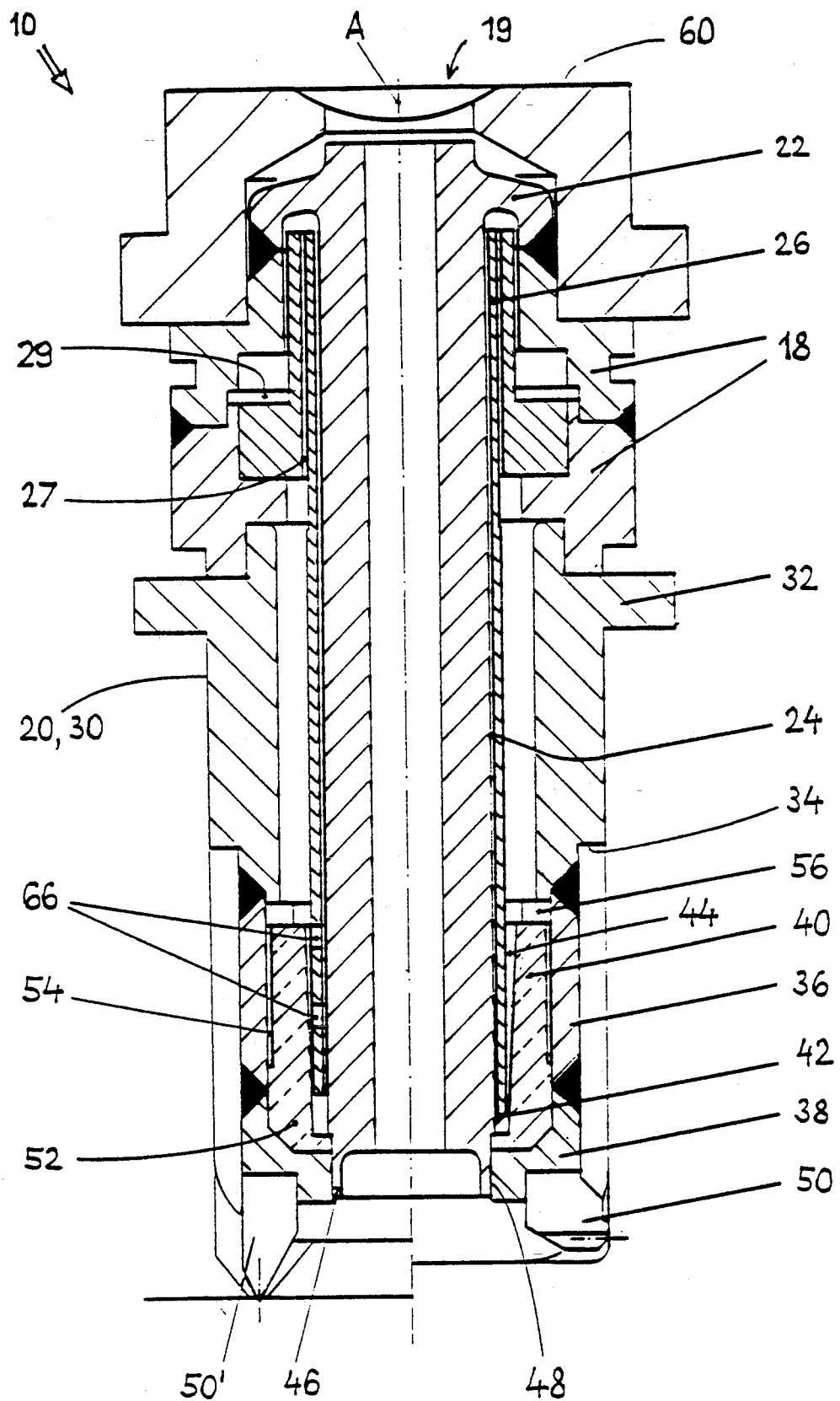

A hot runner nozzle generally designated by 10 is seen in FIGS. 1, 2a, 2b as used in a casing 12 having a mold cavity plate 14 and a divided mold insert 16. The nozzle 10 has a top portion including a broad flanged body 18 continued by a slender shaft 20. A flow tube 22 heatable from its outside extends concentrically through both the flanged body 18 and the shaft 20. A thin electrical insulation layer 24 separates the flow tube 22 from heating means which may be a partly slotted heating tube 26 (FIG. 3). Further insulators 27, 29, e.g. bushes and/or disks, are arranged around or at a lateral electrode terminal 28 serving to supply power to the heating means.

The shaft 20 is thermally graded. It comprises an outer envelope tube 30 the upper portion of which includes a flange 32 engaging the mold cavity plate 14, and further comprises in a lower portion an inward step or shoulder 34 as an outer re-entrant transition to the slender shaft 20. It will be seen that in FIG. 3, the step 34 is of rectangular cross section whereas the envelope tube 30 of FIGS. 1 and 2a shows a slanted shoulder 34.

The outer envelope tube 30 is made of high-strength material such as tool steel of large heat conductivity. At its bottom, the outer envelope tube 30 is welded to a separating sleeve 36 preferably made of a thermally resistive material such as titanium, nickel chromium steel, ceramics or the like, and an again highly heat-conductive, preferably ring-shaped foot portion 38 is welded to sleeve 36.

A heat-conducting bush 40 is inserted inwardly of portions 36, 38. Its lower portion 52 is connected by a welding point 42 to the lower ends of flow tube 22 and heating tube 26. An interior conical gap 44 separates the heat-conducting bush 40 from the lower region of heating tube 26 which has slots 66 there (FIG. 3) for increased electrical resistance in order to concentrate the calorific output at the flow tube end. An outer ring gap 54 isolates the heat-conducting bush 40 from the main portion of the separating sleeve 36. A supporting ring 56 seated between adjacent faces of the bush 40 and the outer envelope tube 30 provides mechanical stability but restricts heat transfer there due to low heat conductivity. The ring 56 is preferably made of a material such as titanium, nickel chromium steel, ceramics, etc.

Nozzle tips 50, 50' are heat-conductingly attached, in particular welded, to the foot portion 38 which is preferably made of tool steel. The nozzle tips 50, 50' may be inclined or outwardly slanted, relative to the axis A, to any angle between 0° and 90° as determined merely by the shapes of the tip seats in the foot portion 38. However, as seen in FIGS. 1, 2a, 2b and righthand in FIG. 3, the tips 50 may extend substantially perpendicular to the axis A of flow tube 22 which passes through the entire hot runner nozzle 10 and is capped on top by a retainer 60. By contrast, one nozzle tip 50' (lefthand in FIG. 3) is vertically oriented, i.e. parallel to the flow tube axis A. The embodiment shown in FIGS. 2a, 2b has one nozzle tip 50 only, and the shaft 20 with its envelope tube 30 is fixed by a framing mounting piece 62 which, in turn, is positioned in the cavity plate 14 by a wedge 64.

Figure 4:
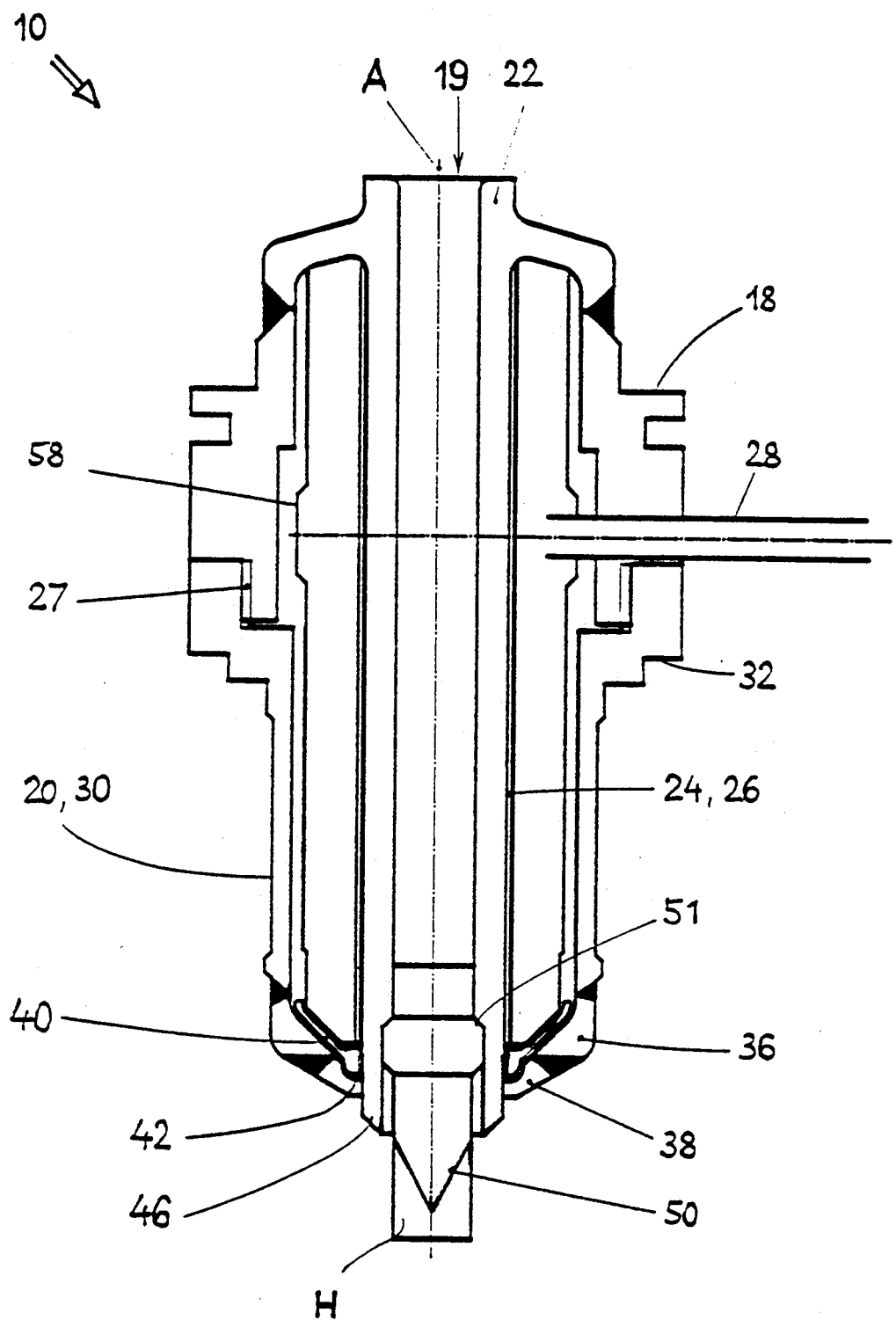
FIG. 4 is a schematic sectional view of another nozzle embodiment.

The embodiment of FIG. 4 is generally of like structure; therefore, like elements are designated by the same reference symbols as in the other figures. Here, too, a cap or retainer 60 (not shown in FIG. 4) may be put on top of the flow tube 22 which contains at its lower end a nozzle tip 50 extending in the direction of axis A into a cavity H of the mold insert 16 (not shown here, either).

About opposite welding point 42, the nozzle tip 50 includes an outer enlargement 51 form-fitted into the lower end of flow tube 22. Sealing lips 46 enclose the body of nozzle tip 50 in its upper retaining region and continue the flow tube 22 integrally. In its lower main portion, however, the nozzle tip 50 does not contact the sealing lips 46. Rather, these extend through the lower end of the heat-conducting bush 40 as well as the shaft foot portion 38 and slidably engage a supporting collar 48 thereof. Translatory or shifting movements between the interengaging elements 38, 40 (or 42, respectively) and 46 will thus not be impeded when caused by thermal expansion or shrinking due to a change or disturbance of the thermal equilibrium. In operation, the melt flows through tube 22 and the high pressure of, say, 1,000 bars (or about 6.5 ton/in$^2$) forces the sealing lips 46 onto the collar 48 without, however, suppressing expansion and contraction movements in an axial direction.

Again, thermal insulation towards the casing 12 (not shown in FIG. 4) is provided by the separating sleeve 36 between heat-conductive shaft portions, i.e. between foot portion 38 and envelope tube 30. Owing to this very simple and economical feature, an exceedingly favorable energy performance is obtained. Contrary to the conventional practice, the outflowing melt will not reach the shaft end portion via bores, channels, etc.

Examples of mounting will be evident from FIGS. 1, 2a, 2b where shaft 20 and outer envelope tube 30 are fitted into the mold cavity plate 14 of casing 12. The envelope tube 30 extends into the mold insert 16 with its full outer diameter but due to inward step 34, the slender separating sleeve 36 is free within a cavity H. Step 34 and/or foot 38 serve to center the shaft 20 and thus the hot runner nozzle 10 whereby the exact shape of the article K to be produced is warranted. A plurality of nozzle tips 50, 50' makes it possible to either gate one article K from various points or to effect simultaneous injection for the production of a number of separate articles.

The heating means can be supplied with low voltage or with mains voltage. In the latter case, the return current is passed through the heating means interior whereas for low voltage operation, it flows directly to the molding tool (casing 12) via flow tube 22 and flanged body 18.

The embodiment of FIGS. 1, 2a, 2b, 3 have another thermodynamic advantage. By heating the flow tube 22 to operational temperatures, it will expand longitudinally. Shaft 20 inclusive of its components 30, 36, 38 will, however, sustain a much lower temperature level owing to good heat insulation so that despite the supply of concentrated heat, an expansion of the nozzle tips 50, 50' will largely be prevented. This is of particular importance for injection points having small diameters since it will not be necessary to adapt the tip lengths or extensions of the respective nozzle tips for their accurate positioning.

Where gating to an article K is effected laterally through a wall in the tool, it happen conventionally that some residual cold plastics material is also injected into the plastic article K so that the product may become faulty. To forestall this, the invention provides the transfer of heat right onto the surface of the article K to be demolded. For this purpose, the tips 50, 50' of the hot runner nozzle 10 are exactly adjusted to the correct position or level in the tool and will not contact it anywhere; heat can leak to the tool wall only via the cavity H filled with the thermoplastic melt which itself is thermally resistive. Metallic conduction along the envelope tube 30 of shaft 20 is counteracted by the insulating means, viz. the gaps 44 and 54 as well as the supporting ring 56 and the separating sleeve 36.

The invention is not limited to the embodiments explained but it will be understood that in a preferred embodiment, a hot runner nozzle 10 having a lateral electrode terminal 28 is retained in a casing 12 of an injection molding machine and includes a shaft 20 which extends into a mold insert 16 and which supports at least one nozzle tip 50, 50' that projects over the shaft up to an article K to be molded. The mold insert comprises an undercut 70 into which the nozzle tips 50, 50' are inserted by a two-step movement, viz. e.g. in a first direction S approximately parallel and then in an transversal direction Q relative to the axis A of a flow tube 22 that is heatable from its outside. The nozzle tips 50, 50' are fixed to a shaft foot portion 38 without contacting the casing 12 or a wall 17 of the mold insert 16. A peripheral step 34 centers the shaft 20 whose high-strength foot portion 38 heat-conductively retains the nozzle tips 50, 50'. A thermally separating sleeve 36 joined to the foot portion 38 is continued towards the casing 12 by a heat-conduction envelope tube 30. An inner heat-conductive bush 40 is thermally insulated from the separating sleeve 36 by air gaps 54, 44 and by a supporting ring 56.

While preferred embodiments have been illustrated and explained hereinabove, it is maintained that many variations and modifications will be apparent to one skilled in the art without departing from the principles of the invention which, therefore, is not to be construed as being restricted to the specific forms described.

I claim:

1. A hot runner nozzle assembly (10) for an injection molding machine which comprises
   (a) a casing (12),
   (b) an elongated shaft (20) mounted centrally in said casing (12),
   (c) a flow tube (22) mounted annularly within said elongated shaft (20) so as to provide a space between the interior walls of said elongated shaft (20) and the exterior walls of said flow tube (22), said flow tube (22) having an inlet and an outlet end,
   (d) heating means positioned in said space for heating said flow tube (22),
   (e) a mold insert (16) having a lateral wall (17) positioned adjacent the outlet end of said flow tube (22), said mold insert (16) consisting of two halves which are adapted to be displaced in a direction transverse to the longitudinal axis of said flow tube (22) and to be wedged in a closed together position within said casing (12), and
   (f) at least one nozzle tip (50, 50') joined to the end of said elongated shaft (20), said at least one nozzle tip (50, 50') extending into said mold insert (16) and having a free end (20), the free end of the at least one nozzle tip (50, 50') extending free of contact through said lateral wall (17) of said mold insert (16).

2. A hot runner nozzle assembly according to claim 1, wherein the molded insert (16) comprises at least one undercut (70) for receiving the at least one nozzle tip (50, 50').

3. A hot runner nozzle assembly according to claim 1 wherein the at least one nozzle tip is adapted to be attached to the shaft foot portion (38) at an angle between 0° and 90° relative to the longitudinal axis of the flow tube (22).

4. A hot runner nozzle assembly according to claim 3 wherein said at least one nozzle tip (50, 50') projects laterally outward beyond the diameter of said shaft (20).

5. A hot runner nozzle assembly (10) for an injection molding machine which comprises
   (a) a casing (12),
   (b) an elongated shaft (20) having an upper end and a lower end mounted centrally in said casing (12), a separating sleeve (36) joined to the lower end of said shaft (20), and a ring-shaped foot portion (38) connected to the lower end of said separating sleeve (36),
   (c) a flow tube (22) mounted annularly within said elongated shaft (20) so as to provide a space between the interior walls of said elongated shaft (20) and the exterior walls of said flow tube (22), said flow tube (22) having an inlet and an outlet end,
   (d) heating means positioned in said space for heating said flow tube (22),
   (e) a mold insert (16) having a lateral wall (17) positioned adjacent the outlet end of said flow tube (22), said mold insert (16) consisting of two halves which are adapted to be displaced in a direction transverse to the longitudinal axis of said flow tube (22) and to be wedged in a closed together position within said casing (12), and
   (f) at least one nozzle tip (50, 50') joined to the end of said foot portion (38), said at least one nozzle tip (50, 50') extending into said mold insert (16) and having a free end (20), the free end of the at least one nozzle tip (50, 50') extending free of contact through said lateral wall (17) of said mold insert (16).

6. A hot runner nozzle assembly according to claim 5, wherein the at least one nozzle tip (50, 50') is fixed to said foot portion (38) and is free of contact with the casing (12).

7. A hot runner nozzle assembly according to claim 6 wherein said at least one nozzle tip (50, 50') projects laterally outwardly beyond the diameter of said shaft (20).

8. A hot runner nozzle assembly according to claim 5, wherein said foot portion (38) is radially spaced from the casing (12).

9. A hot runner nozzle assembly according to claim 5, wherein the at least one nozzle tip (50, 50') is retained and centered by said foot portion (38).

10. A hot runner nozzle assembly according to claim 5, wherein said separating sleeve (36) is recessed relative to the elongated shaft (30) so as to form an inwardly directed peripheral step or shoulder (34).

11. A hot runner nozzle assembly according to claim 5, wherein thermal insulation in the form of air gaps (54, 44), is provided between the upper portion of the heat-conducting component (40) and the thermally separating sleeve (36), as well as the heating means, (26) such that there is at least one conical gap (54) widening upwardly from the lower portion (52) of the heat-conducting component (40).

12. A hot runner nozzle assembly (10) for an injection molding machine which comprises
   (a) a casing (12),
   (b) an elongated shaft (20) having an upper end and a lower end mounted centrally in said casing (12), a separating sleeve (36) joined to the lower end of said shaft (20), a ring-shaped foot portion (38) connected to the lower end of said separating sleeve (36), and a heat conducting component (40) positioned between a flow tube (22) and said sleeve (36),
   (c) said flow tube (22) mounted annularly within said elongated shaft (20) so as to provide a space between the interior walls of said elongated shaft (20) and the exterior walls of said flow tube (22), said flow tube (22) having an inlet and an outlet end,
   (d) heating means positioned in said space for heating said flow tube (22),
   (e) a mold insert (16) having a lateral wall (17) positioned adjacent the outlet end of said flow tube (22), said mold insert (16) consisting of two halves which are adapted to be displaced in a direction transverse to the longitudinal axis of said flow tube (22) and to be wedged in a closed together position within said casing (12), and
   (f) at least one nozzle tip (50, 50') joined to the end of said foot portion (38), said at least one nozzle tip (50, 50') extending into said mold insert (16) and having a free end (20), the free end of the at least one nozzle tip (50, 50') extending free of contact through said lateral wall (17) of said mold insert (16).

13. A hot runner nozzle assembly according to claim 12, wherein said heat-conducting component (40) is a metallic bush whose lower portion (52) is fixed to the lower ends of the flow tube (22), the heating means (26) and the shaft foot portion (38).

14. A hot runner nozzle assembly according to claim 12, wherein at least one resistive supporting ring (56) is seated between adjacent faces of the upper portion of the heat-conducting component (40) and the thermally separating sleeve (36).

* * * * *